(12) United States Patent
Goeke et al.

(10) Patent No.: US 10,704,607 B2
(45) Date of Patent: Jul. 7, 2020

(54) FLEXIBLE COUPLING ARRANGEMENTS FOR DRIVE SYSTEMS

(71) Applicant: Delavan Inc, West Des Moines, IA (US)

(72) Inventors: Jerry L. Goeke, West Des Moines, IA (US); Jeffrey Mathis, Rome, NY (US)

(73) Assignee: Goodrich Corporation, Charlotte, NC (US)

( * ) Notice: Subject to any disclaimer, the term of this patent is extended or adjusted under 35 U.S.C. 154(b) by 43 days.

(21) Appl. No.: 15/243,584

(22) Filed: Aug. 22, 2016

(65) Prior Publication Data

US 2018/0051753 A1      Feb. 22, 2018

(51) Int. Cl.
*F16D 3/72*       (2006.01)

(52) U.S. Cl.
CPC ...................... *F16D 3/72* (2013.01)

(58) Field of Classification Search
CPC ................. F16D 3/06; F16D 3/72; F16D 3/76
USPC ................... 464/79, 80, 97; 244/60
See application file for complete search history.

(56) References Cited

U.S. PATENT DOCUMENTS

| 6,094,799 | A | 8/2000 | Stewart et al. |
| 8,641,463 | B2 | 2/2014 | Shuto et al. |
| 9,260,924 | B2 * | 2/2016 | Collins ................. E21B 43/128 |
| 2015/0051003 | A1 * | 2/2015 | Julian ....................... F16D 3/74 464/79 |

FOREIGN PATENT DOCUMENTS

| EP | 2837843 A2 | 2/2015 |
| FR | 2329178 A1 | 5/1977 |
| GB | 929323 A | 6/1963 |
| JP | H0585475 A | 4/1993 |

OTHER PUBLICATIONS

Extended European Search Report for European Patent Application No. 17187194.0, dated Jan. 19, 2018.

* cited by examiner

*Primary Examiner* — Greg Binda
(74) *Attorney, Agent, or Firm* — Locke Lord LLP; Scott D. Wofsy; Joshua L. Jones (57) ABSTRACT

A flexible coupling arrangement includes an outer first member, an outer second member, and an outer flexible coupling. The outer flexible coupling is arranged to transmit torque between the outer first member and the outer second member while allowing at least one of angular misalignment and axial misalignment between the outer first member and the outer second member. The flexible coupling also includes an inner first member, an inner second member, and inner flexible coupling. The inner flexible coupling arranged to transmit torque between the inner first member and the inner second member while allowing at least one of angular misalignment and axial misalignment between the inner first member and the inner second member. The inner flexible coupling is positioned radially inward of the outer flexible coupling.

13 Claims, 6 Drawing Sheets

FLEXIBLE COUPLING ARRANGEMENTS FOR DRIVE SYSTEMS

BACKGROUND OF THE INVENTION

1. Field of the Invention

The present disclosure relates to drive systems, and more particularly to flexible coupling arrangements for drive systems such as in rotorcraft.

2. Description of Related Art

Transmissions, such as in rotorcraft, are commonly used to transfer torque from a motor or engine to a rotor assembly along a load path. Since the motor or engine is generally remote from the rotor assembly, one or more driving members typically interconnect the motor or engine with the rotor assembly and transmit torque from the motor or engine to the driven rotor assembly. In some transmissions it can be necessary that the motor or engine provide torque to more than one rotor assembly. In such transmissions an intervening gear arrangement, such as a gearbox, is generally arranged to receive torque from the engine or shaft and apply the torque to the rotor assembles. The gearbox is generally located in proximity to the rotor assemblies to facilitate applying torque to each of the rotor assemblies.

Such conventional methods and systems have generally been considered satisfactory for their intended purpose. However, there is still a need in the art for improved flexible coupling arrangements, drive systems, and methods of transmitting torque. The present disclosure provides a solution for this need.

SUMMARY OF THE INVENTION

A flexible coupling arrangement includes an outer first member, an outer second member, and an outer flexible coupling. The outer flexible coupling is arranged to transmit torque between the outer first member and the outer second member while allowing either or both angular misalignment and axial misalignment between the outer first member and the outer second member. The flexible coupling also includes an inner first member, an inner second member, and inner flexible coupling. The inner flexible coupling arranged to transmit torque between the inner first member and the inner second member while allowing either or both of angular misalignment and axial misalignment between the inner first member and the inner second member. The inner flexible coupling is positioned radially inward of the outer flexible coupling.

In certain embodiments, the outer flexible coupling can include a flanged member. The flanged member can seat the inner flexible coupling. The inner flexible coupling can be axially constrained within the outer flexible coupling, such as in compression, tension, or both compression and tension. A bearing can be seated within the outer flexible coupling. The inner flexible coupling can be slideably received within the bearing.

In accordance with certain embodiments, the outer flexible coupling can include a plurality of diaphragm elements. The plurality of diaphragm elements can be connected to one another at outer peripheries of the diaphragm elements. The plurality of diaphragm elements can be connected to one another at inner peripheries of the diaphragm elements. The plurality of diaphragm elements can axially overlap the inner flexible coupling along the rotation axis. It is contemplated that the diaphragm elements of the outer flexible coupling can bend in concert with the inner flexible coupling.

It is also contemplated that, in accordance with certain embodiments, the inner flexible coupling can define a rotation axis. The outerflexible coupling can be concentrically arranged about the rotation axis. The outer flexible coupling can be concentrically arranged about the rotation axis in a nominal condition. The outer flexible coupling can be concentrically arranged about the rotation axis in an angularly misaligned condition. The inner flexible coupling can include a quill shaft. The inner flexible coupling can be solid along its length, hollow along its length, or have both a solid portion and a hollow portion axially stacked along its length.

A drive system includes a flexible coupling arrangement as described above. The outer flexible coupling includes first and second diaphragm elements connected to one another at their outer peripheries. The inner flexible coupling includes a quill shaft. An outer driven member is connected to the outer flexible coupling. An inner driven member is connected to the inner flexible coupling. In certain embodiments, a single rotor assembly can be operably connected to the outer driven member and the inner driven member. In accordance with certain embodiments, a first rotor assembly can be operably connected to the outer driven member and a second rotor assembly can be operably connected to the inner driven member. The first rotor assembly and the second rotor assembly can be concentrically arranged for common rotation about a rotor assembly axis.

A method of transmitting torque includes transmitting torque between an outer first member and an outer second member connected by an outer flexible coupling while allowing misalignment between outer first member and the outer second member. The method also includes transmitting torque between an inner first member and an inner second member connected by an inner flexible coupling while allowing misalignment between the inner first member and the inner second member. In certain embodiments the misalignment can be an axial misalignment. In accordance with certain embodiments, the misalignment can be an angular misalignment. It is contemplated that the misalignment can be both an axial misalignment and an angular misalignment.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
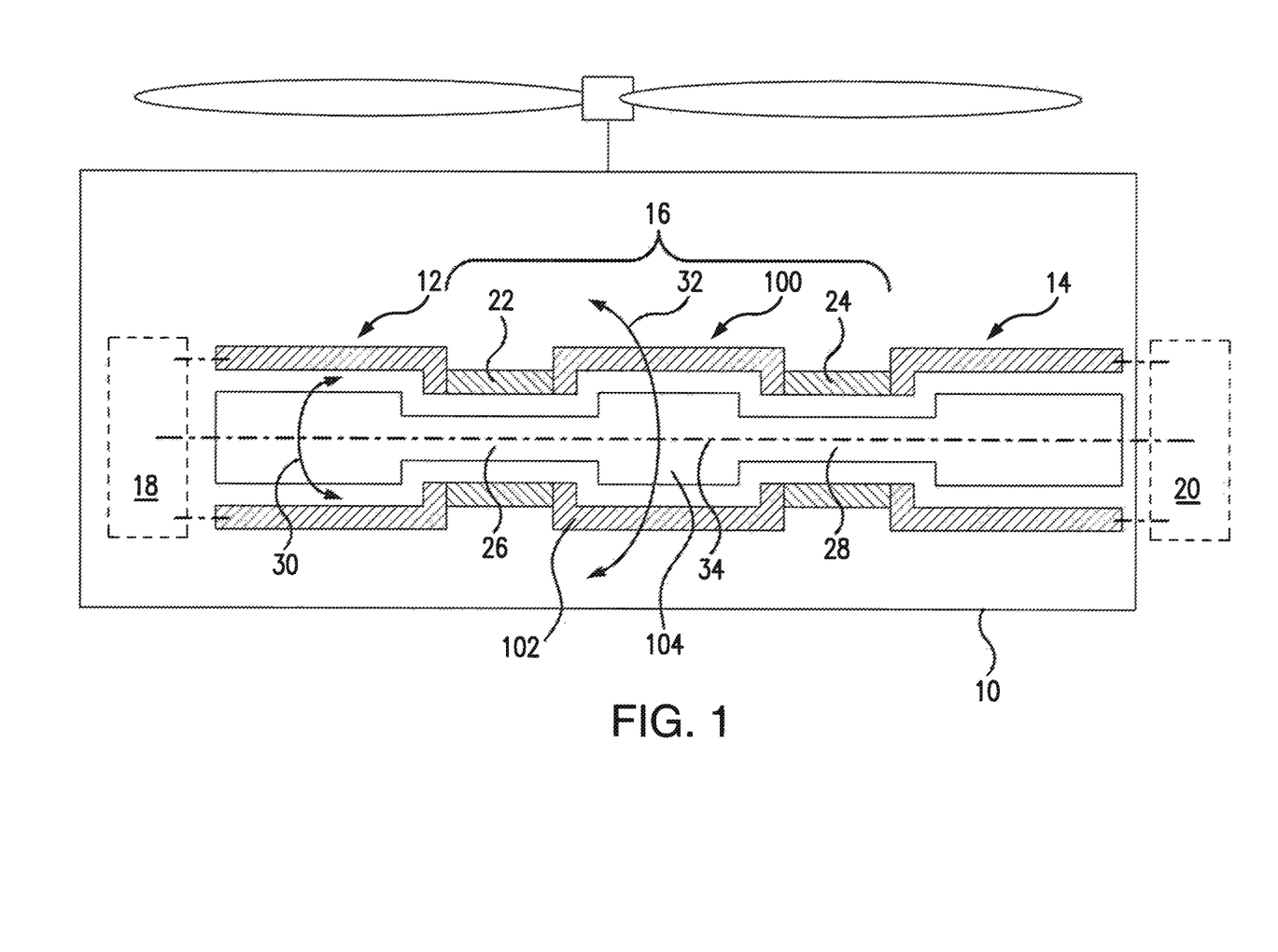
FIG. 1 is a schematic view of an exemplary embodiment of a rotorcraft constructed in accordance with the present disclosure, showing a drive system with a flexible coupling arrangement.

Reference will now be made to the drawings wherein like reference numerals identify similar structural features or aspects of the subject disclosure. For purposes of explanation and illustration, and not limitation, a partial view of an exemplary embodiment of a flexible coupling arrangement in accordance with the disclosure is shown in FIG. 1 and is designated generally by reference character 100. Other embodiments of flexible coupling arrangements, drive systems, and methods of transmitting torque are shown in FIGS. 2-6, as will be described. The systems and methods described herein can be used for communicating mechanical rotation between sources of mechanical rotation and to rotor assemblies, such as in rotorcraft compound coaxially mounted rotor systems, though the present disclosure is not limited to a particular type of rotor system or to aircraft in general.

Referring to FIG. 1, an exemplary rotorcraft, e.g., a helicopter 10, is shown. Helicopter 10 includes an input gearbox 12, an output gearbox 14, a drive system 16, motor 18, and a rotor assembly 20. Motor 18 is operably connected to rotor assembly 20 through input gearbox 12, drive system 16, and output gearbox 14. Drive system 16 includes flexible coupling arrangement 100. It is contemplated that rotor assembly 20 can be a redundantly driven single rotor assembly. It is also contemplated that rotor assembly 20 can include coaxial, contra-rotating rotor assemblies.

Flexible coupling arrangement 100 includes an outer first member 22, an outer second member 24, and an outer flexible coupling 102. Flexible coupling arrangement 100 also includes an inner first member 26, an inner second member 28, and an inner flexible coupling 104. Outer flexible coupling 102 is arranged to transmit torque 32 between outer first member 22 and outer second member 24 while allowing either or both of angular misalignment and axial misalignment between outer first member 22 and outer second member 24. Inner flexible coupling 104 is arranged to transmit torque 30 between inner first member 26 and inner second member 28 while allowing either or both of angular misalignment and axial misalignment between inner first member 26 and inner second member 28. Inner flexible coupling 104 is positioned radially inward of outer flexible coupling 27 relative to a rotation axis 34. Outer first member 22 comprises a flanged member with a hollow interior connected to the outer flexible coupling 102.

Figure 2:
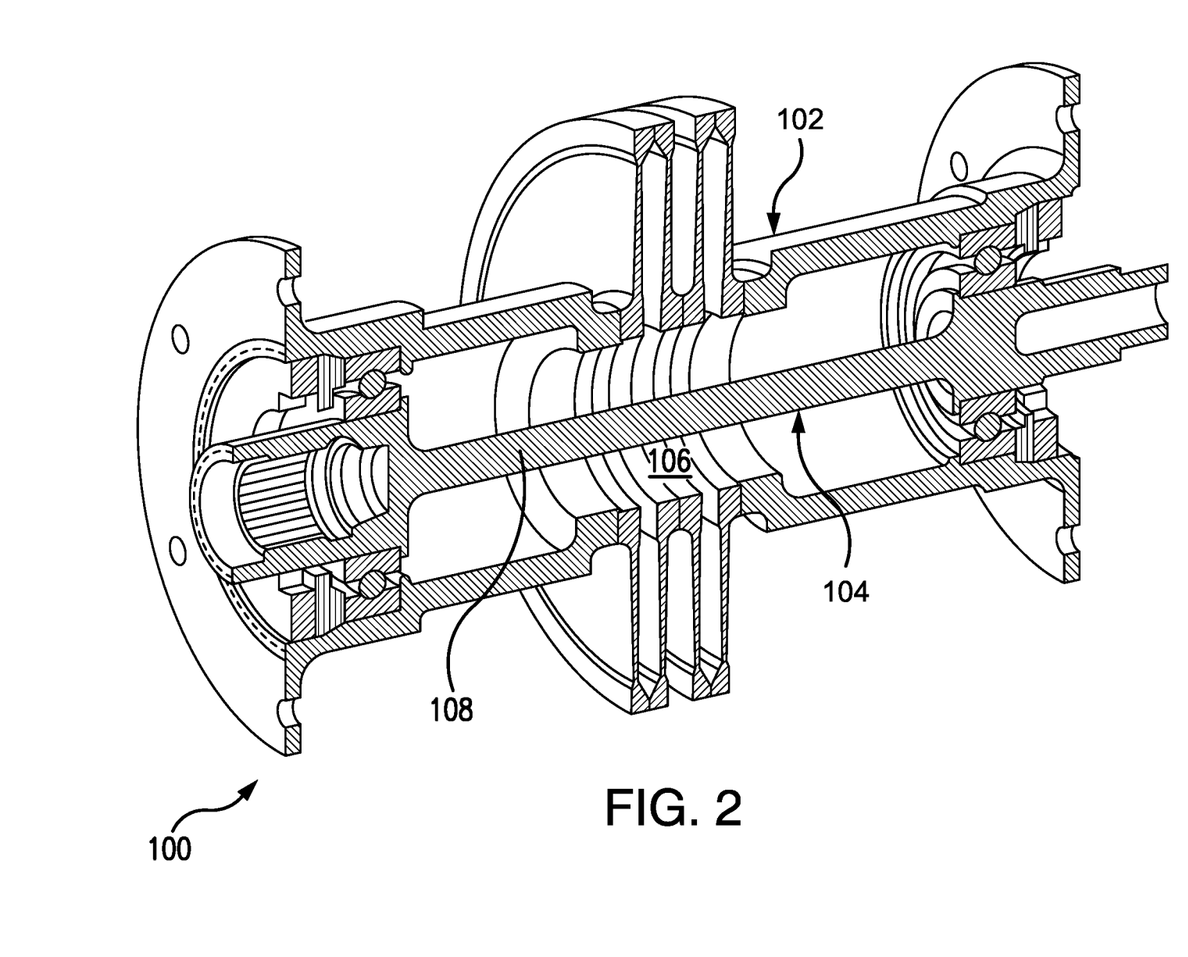
FIG. 2 is a cross-sectional view of the flexible coupling arrangement of FIG. 1, showing an inner flexible coupling supported for rotation within an outer flexible coupling.

Referring to FIG. 2, flexible coupling 100 is shown. Flexible coupling 100 includes an inner flexible coupling 104 and an outer flexible coupling 102 with a hollow interior 106. Inner flexible coupling 104 is disposed within hollow interior 106 of outer flexible coupling 102. Inner flexible coupling 104 is rotatably supported within outer flexible coupling 102 such that outer flexible coupling 102 and inner flexible 104 coupling communicate torque along concentric load paths while accommodating misalignment between interconnected rotatable members disposed along the concentric load paths.

Figure 3:
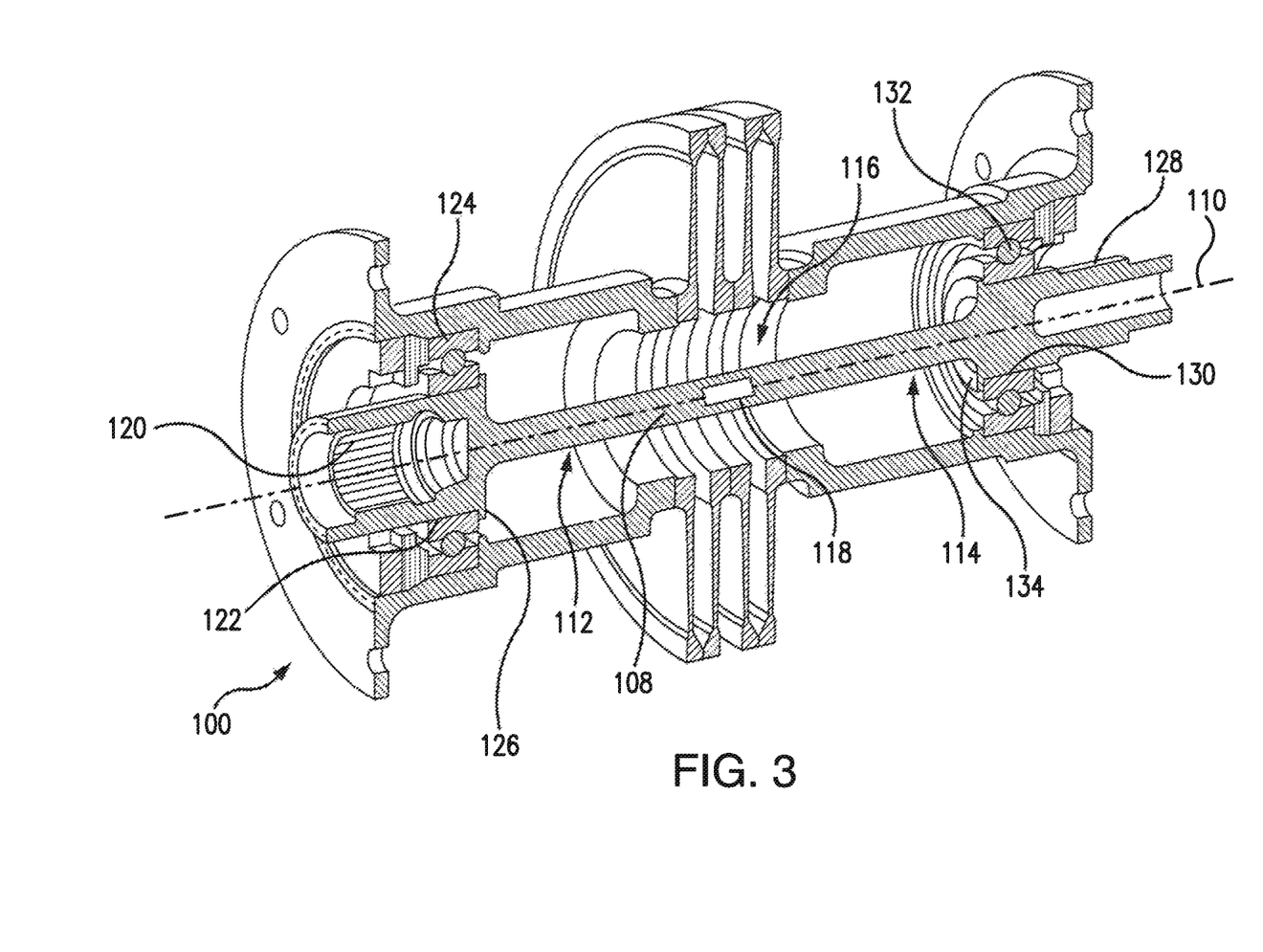
FIG. 3 is a cross-sectional view of the flexible coupling arrangement of FIG. 1, showing a flexible coupling arrangement where the inner flexible coupling is quill shaft.

Referring to FIG. 3, inner flexible coupling 104 is shown. Inner flexible coupling 104 includes a quill shaft 108. Quill shaft 108 defines a rotation axis 110 and has a first end portion 112 connected to an opposed second end portion 114 by a middle portion 116. Quill shaft 108 can be solid along its axial length. As indicated schematically by box 118, quill shaft 108 can also have a hollow interior portion extending along at least a portion of the axial length of quill shaft 108. In the illustrated exemplary embodiment middle portion 116 has substantially the same thickness as first end portion 112 and second end portion 114 in the radial direction. This is for illustration purposes only and is non-limiting. As will be appreciated by those of skill in the art in view of the present disclosure, middle portion 116 can be thinner or thicker than either (or both) first end portion 112 and second end portion 114 in the radial direction, as suitable for an intended application.

Quill shaft 108 includes an axial take-up structure 120. Axial take-up structure 120 can be arranged axially outboard of first end portion 112, may be axially outboard of a first bearing receiving surface 122, and can be arranged to be rotational fixed and be axially free relative to inner first member 26 (shown in FIG. 1), thereby allowing axial take-up. As illustrated in FIG. 3, axial take-up structure 120 includes a female spline arrangement. It is contemplated axial take-up structure 120 can include a male spline arrangement or any other type of axially free and rotatably fixed torque transmission structure, as suitable for an intended application.

First bearing receiving surface 122 is configured and adapted to be slideably received within a first bearing structure, e.g., a first bearing assembly 124. A first axial stop 126 is axially interposed between axial take-up structure 120 first end portion 112, first axial stop 126 being a flange extending radially outward from first bearing receiving surface 122 and arranged to resist axial three exerted from middle portion 116 toward axial take-up structure 120.

Quill shaft 108 also includes an axial take-up structure 128. Axial take-up structure 128 is similar to axial take-up structure 120 with the difference that axial take-up structure 128 is arranged axially outboard of second end portion 114, is axially outboard of a second bearing receiving surface 130, and includes a male splined structure. As will be appreciated by those of skill in the art in view of the present disclosure, axial take-up structure 128 can include a male spline arrangement or any other type of axially free and rotatably fixed torque transmission structure, as suitable for an intended application.

Second bearing receiving surface 130 is configured and adapted to be slideably received within a second bearing structure, e.g., a second bearing assembly 132. A second axial stop 134 is axially interposed between axial take-up structure 128 and second end portion 114, second axial stop 134 being a flange extending radially outward from second bearing receiving surface 130 and arranged to resist axial force exerted from middle portion 116 and towards axial take-up structure 128.

Figure 4:
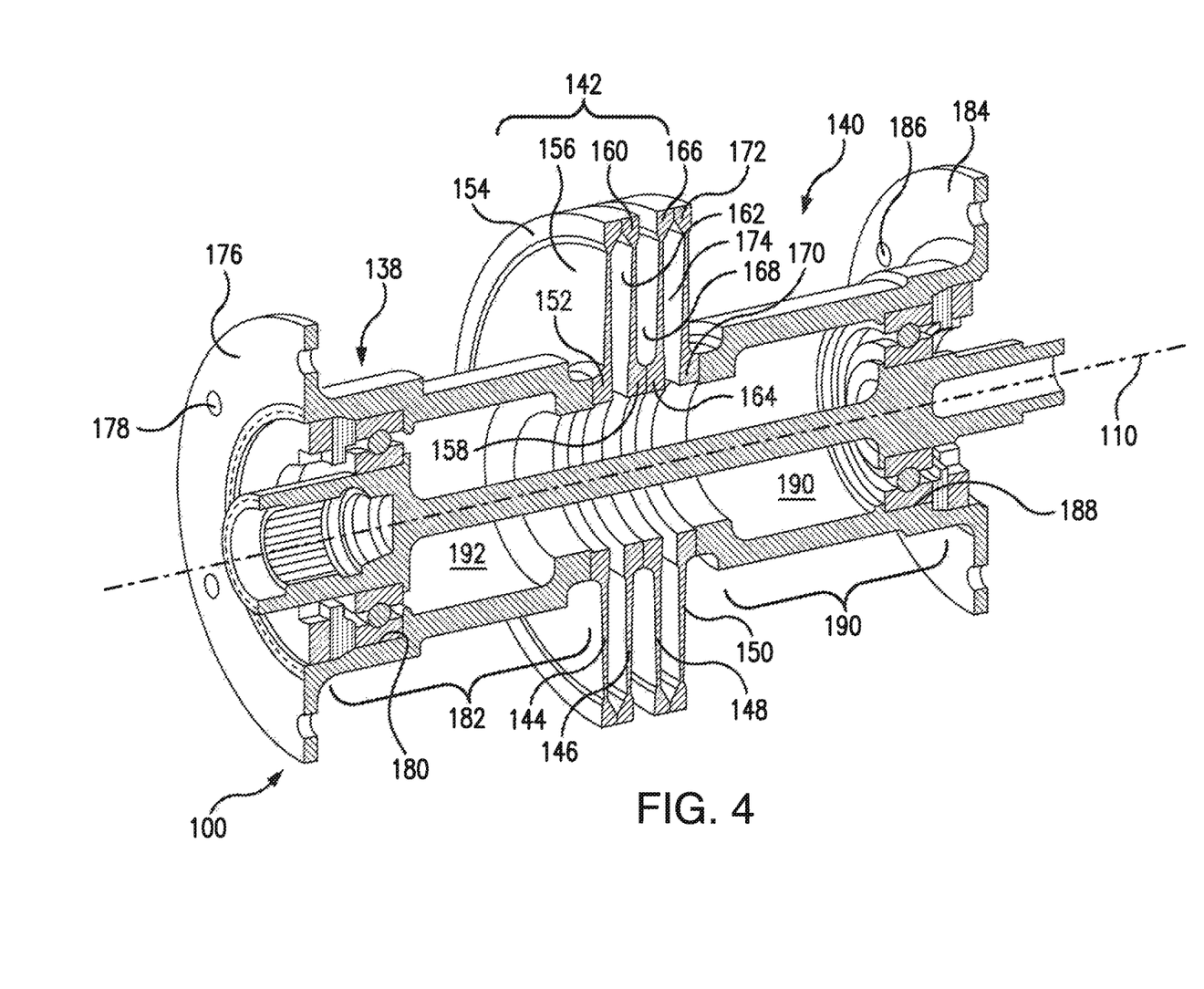
FIG. 4 is a cross-sectional view of the flexible coupling arrangement of FIG. 1, showing a flexible coupling arrangement where the outer flexible coupling is a diaphragm coupling.

With reference to FIG. 4, outer flexible coupling 102 is shown. Outer flexible coupling 102 is disposed about rotation axis 110 and includes a first flanged member 138, a second flanged member 140, and a flexible diaphragm body 142. Flexible diaphragm body 142 includes a plurality of diaphragm elements axially stacked about rotation axis 110 In the illustrated exemplary embodiment flexible diaphragm body 142 includes a first diaphragm element 144, a second diaphragm element 146, a third diaphragm element 148, and a fourth diaphragm element 150. Although illustrated as having four diaphragm elements, it is to be understood and appreciated that flexible diaphragm body 142 can have fewer than four or more than four diaphragm elements, as suitable for a given application.

First diaphragm element 144 has an inner periphery 152 connected to an outer periphery 154 by a radially tapering body 156 and is axially interposed between first flanged member 136 and second diaphragm element 146. Second diaphragm element 146 has an inner periphery 158 connected to an outer periphery 160 by a radially tapering body 162 and is axially interposed between first diaphragm element 144 and third diaphragm element 148. Third diaphragm element 148 has an inner periphery 164 connected to an outer periphery 166 by a radially tapering body 168 and is axially interposed between second diaphragm element 146 and fourth diaphragm element 150. Fourth diaphragm element 150 has an inner periphery 170 connected to an outer periphery 172 by a radially tapering body 174 and is axially interposed between third diaphragm element 148 and second flanged member 140.

First flanged member 138 is connected to inner periphery 152 of first diaphragm element 144. First diaphragm element 144 is connected at its outer periphery 154 to outer periphery 160 of second diaphragm element 146. Second diaphragm element 146 is connected at its inner periphery 158 to inner periphery 164 of third diaphragm element 148. Third diaphragm element 148 is connected at its outer periphery 166 to outer periphery 172 of fourth diaphragm element 150. Fourth diaphragm element 150 is connected at it inner periphery 170 to second flanged member 140. These connections, which may be welds, render the flexible diaphragm body 142 a unitary element.

First flanged member 138 includes a flange 176 with a fastener pattern 178, a bearing seat 180, and input assembly 182. Input assembly 182 extends radially inward and axially inboard relative to flange 176 and is substantially rigid as it connects first flanged member to flexible diaphragm body 142 on an axial end opposite second flanged member 140. Bearing seat 180 is dispose within an axially extending cavity bounded by an interior surface of first flanged member 138, and is arranged to fix first bearing assembly 124 (shown in FIG. 3). Fastener pattern 178 is arranged to fix in rotation and outer first member 22 (shown in FIG. 1).

Second flanged member 140 is similar to first flanged member 138 and includes a flange 184 with a fastener pattern 186, a bearing seat 188, and an output assembly 190. Output assembly 190 extends radially inward and axially inboard relative to flange 184, is substantially rigid, and connects second flanged member 140 to flexible diaphragm body 142 on an axial end opposite first flanged member 138. Bearing seat 188 is dispose within an axially extending cavity bounded by an interior surface of second flanged member 140, and is arranged to fix second bearing assembly 132 (shown in FIG. 3). Fastener pattern 186 is arranged to fix in rotation the outer first member 22 (shown in FIG. 1).

Figure 5:
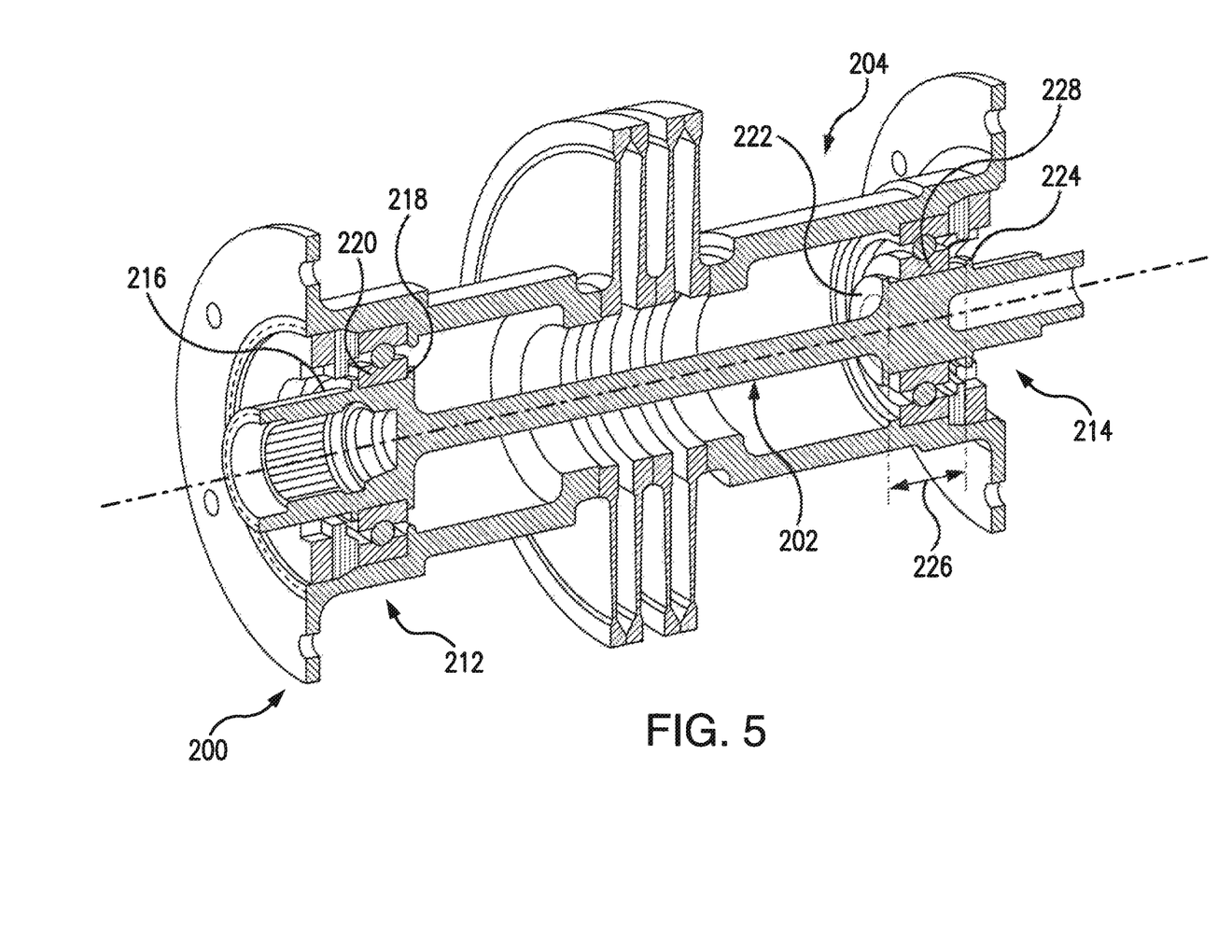
FIG. 5 is a cross-sectional view of another embodiment of a flexible coupling arrangement of FIG. 1, showing an inner flexible coupling axially fixed on one end and axially free on an opposite end relative to the outer flexible coupling.

With reference to FIG. 5, a flexible coupling arrangement 200 is shown. Flexible coupling arrangement 200 is similar to flexible coupling arrangement 100, and additionally includes an inner flexible coupling 202 that is axially fixed relative to the outer flexible coupling 204 on a first end portion 212, and which is axially free relative to outer flexible coupling 204 on an opposite second end portion 214. In this respect first end portion 212 has a first axial stop 216 and a second axial stop 218 which are axially spaced apart from one another and which each abut a bearing 220. Second end portion 214 has a first axial stop 222 and second axial 224 which are spaced apart from one another by a stop gap 226. A bearing 228 with an axial width that is smaller than a width of stop gap 226 is slideably received by second end portion 214, thereby allowing second end portion 214 to axially displace relative to outer flexible coupling 204. This allows a limited amount of axially lengthening or shortening of outer flexible coupling 204 independent of inner flexible coupling, enabling accommodation of axially shifting from rotor assembly heating or other factors.

Figure 6:
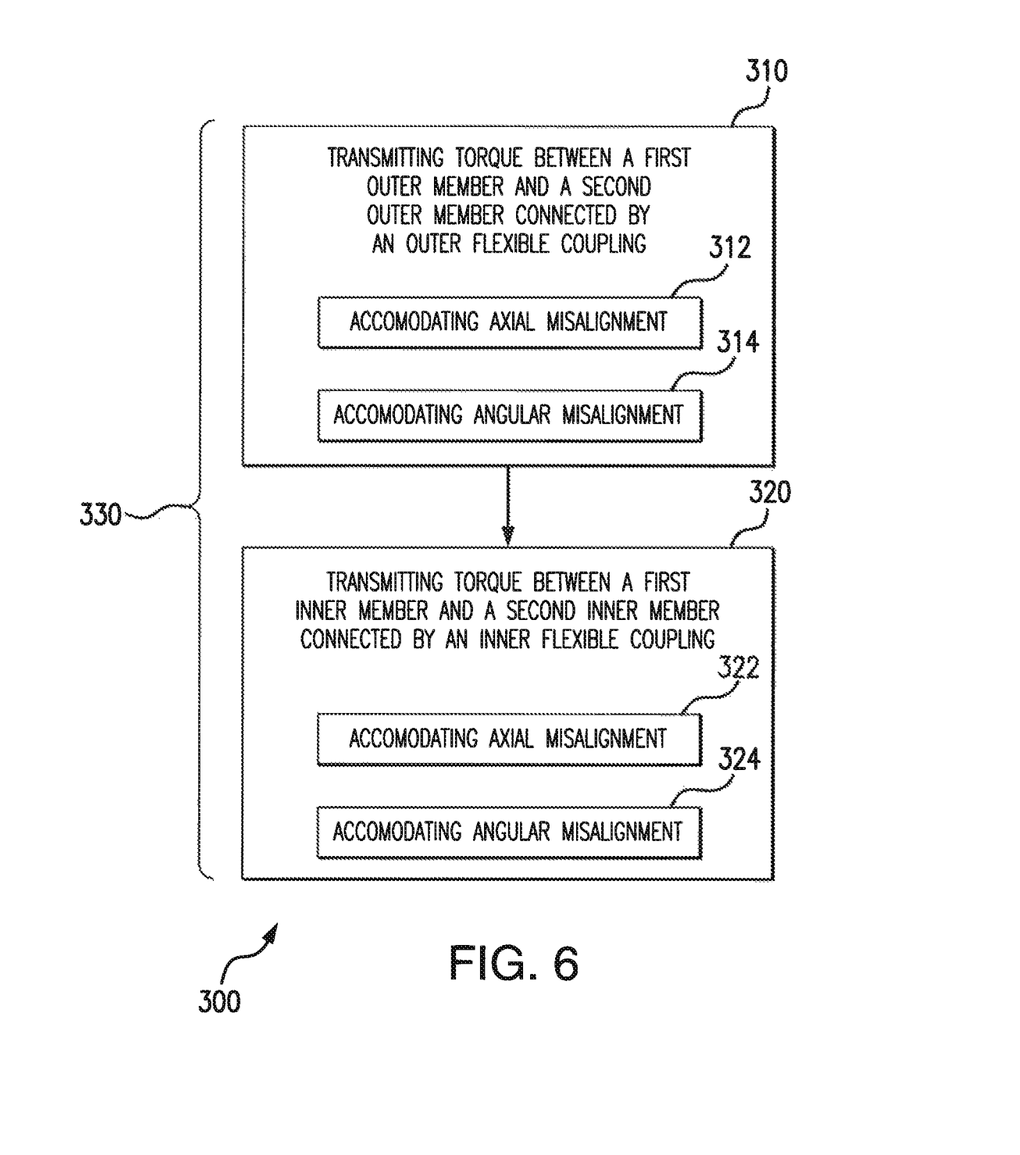
FIG. 6 is a box diagram of a method of transmitting torque through inner members and outer members using a flexible coupling arrangement, showing torque transmission between while a flexible coupling arrangement accommodates misalignment between first and second inner members and first and second outer members.

With reference to FIG. 6, a method 300 of transmitting torque is shown. Method 300 includes transmitting torque, e.g., torque 32 (shown in FIG. 1) between an outer first member, e.g., outer first member 22 (shown in FIG. 1) and an outer second member, e.g., outer second member 24 (shown in FIG. 1) connected by an outer flexible coupling, e.g., outer flexible coupling 102 (shown in FIG. 1). The torque is transmitted while allowing misalignment between outer first member and the outer second member. The misalignment between the outer first member and the outer second member can be axial misalignment, angular misalignment, or both axial and angular misalignment, as shown with box 312 and box 314.

Method 300 also includes transmitting torque, e.g., torque 30 (shown in FIG. 1), between an inner first member, e.g., inner first member 26 (shown in FIG. 1), and an inner second member, e.g., inner second member 28 (shown in FIG. 1), connected by an inner flexible coupling, e.g., inner flexible coupling 104 (shown in FIG. 1). The misalignment between the inner first member and the inner second member can be axial misalignment, angular misalignment, or both axial and angular misalignment, as shown with box 322 and box 324. As indicted by bracket 330, torque can be transmitted between the inner members independent of torque transmission through the outer members. Torque transmission through the outer members can be independent of torque transmission through the inner. Torque transmission can occur simultaneously through the inner members and the outer members.

In embodiments described herein, flexible coupling arrangement 100 provides for bending between concentric load paths. Providing bending between concentric load paths in turn allows drive system 16 (shown in FIG. 1) to use of relatively long concentric driving members. Being relatively long, drive system 16 can provide a redundant drive system to a unitary rotor assembly, e.g., a helicopter tail rotor system. Drive system can also provide independent drive systems to each rotor assembly of a compound rotor assembly, e.g., a coaxial contra-rotating rotor system, in a comparatively compact arrangement.

In certain embodiments, flexible coupling arrangement 100 allows for the application of torque to one or more rotor assemblies without the need for an intervening gearbox. This can save weight and/or simplify the construction of rotorcraft as the center of gravity of rotorcraft is not influenced by the intervening gearbox. In accordance with certain embodiments, flexible coupling arrangement 100 provides for a more compact drive system arrangement than possible with a single load path for a given power level. It is also contemplated that, in certain embodiments, flexible coupling arrangement 100 can provide a single-drive flight regime to an aircraft, inner flexible coupling or outer coupling solely providing torque to a rotor assembly.

The methods and systems of the present disclosure, as described above and shown in the drawings, provide for flexible couplings with superior properties including bending between concentric load paths. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A drive system, comprising:
a flexible coupling arrangement including:
an outer first member;
an outer second member;
an outer flexible coupling configured to transmit torque between the outer first member and the outer second member while allowing at least one of angular misalignment and axial misalignment between the outer first member and the outer second member;
an inner first member;
an inner second member; and
an inner flexible coupling configured to transmit torque between the inner first member and the inner second member while allowing at least one of angular misalignment and axial misalignment between the inner first member and the inner second member, the inner flexible coupling being positioned radially inward of the outer flexible coupling
wherein the outer flexible coupling comprises a first diaphragm element and a second diaphragm element, the first diaphragm element being connected to the second diaphragm element at an outer periphery of the first diaphragm element,
wherein the inner flexible coupling includes a quill shaft, and
further comprising a bearing assembly disposed externally of the first diaphragm element and the second diaphragm element and supporting the quill shaft for rotation within the outer flexible coupling.

2. The drive system as recited in claim 1, wherein the outer flexible coupling is configured to transmit torque between the outer first member and the outer second member while allowing both angular misalignment and axial misalignment between the outer first member and the outer second member, wherein the inner flexible coupling is configured to transmit torque between the inner first member and the inner second member while allowing both angular misalignment and axial misalignment between the inner first member and the inner second member.

3. The drive system as recited in claim 1, wherein the outer first member comprises a flanged member with a hollow interior connected to the outer flexible coupling.

4. The drive system as recited in claim 1, wherein the inner flexible coupling is rotatably supported within an interior of the outer flexible coupling.

5. The drive system as recited in claim 4, wherein the inner flexible coupling is axially fixed relative to a flanged member of the outer flexible coupling.

6. The drive system as recited in claim 4, wherein the inner flexible coupling is axially free relative to a flanged member of the outer flexible coupling.

7. The drive system as recited in claim 4, wherein the inner flexible coupling is axially free relative to a flanged member of the outer flexible coupling within a predetermined axial range.

8. The drive system as recited in claim 1, wherein the inner flexible coupling defines a rotation axis, wherein the outer flexible coupling is concentrically arranged about the rotation axis.

9. The drive system as recited in claim 1, wherein the inner flexible coupling is solid along at least a portion of a length of the inner flexible coupling.

10. The drive system as recited in claim 1, wherein the inner flexible coupling is hollow along at least a portion of a length of the inner flexible coupling.

11. The drive system as recited in claim 1, further comprising:
a first rotor assembly operably connected to the outer flexible coupling; and
a second rotor assembly operably connected to the inner flexible coupling, wherein the first rotor assembly and the second rotor assembly are concentrically arranged for common rotation about a rotor assembly axis.

12. The drive system as recited in claim 1, further comprising a rotor assembly operably connected to the outer flexible coupling and the inner flexible coupling.

13. A drive system, comprising:
a flexible coupling arrangement, comprising:
an outer first member;
an outer second member;
an outer flexible coupling configured to transmit torque between the outer first member and the outer second member while allowing at least one of angular misalignment and axial misalignment between the outer first member and the outer second member;
an inner first member;
an inner second member;
an inner flexible coupling configured to transmit torque between the inner first member and the inner second member while allowing at least one of angular misalignment and axial misalignment between the inner first member and the inner second member, the inner flexible coupling being positioned radially inward of the outer flexible coupling,
wherein the outer flexible coupling comprises a first diaphragm element and a second diaphragm element, the first diaphragm element being connected to the second diaphragm element at an outer periphery of the first diaphragm element, wherein the inner flexible coupling includes a quill shaft; and
a bearing assembly disposed externally of the first diaphragm element and the second diaphragm element and supporting the quill shaft for rotation within the outer flexible coupling;
a first rotor assembly operably connected to the outer flexible coupling; and
a second rotor assembly operably connected to the inner flexible coupling, wherein the first rotor assembly and the second rotor assembly are concentrically arranged for common rotation about a rotor assembly axis.

* * * * *